(12) United States Patent
Han et al.

(10) Patent No.: US 8,850,068 B2
(45) Date of Patent: Sep. 30, 2014

(54) UNITED ROUTER FARM SETUP

(75) Inventors: Lin Han, San Jose, CA (US); Renwei Li, Fremont, CA (US); Katherine Zhao, San Jose, CA (US); Shujin Zhang, Palo Alto, CA (US); Xiaoqian Wu, Beijing (CN)

(73) Assignee: Futurewei technologies, Inc., Plano, TX (US)

( * ) Notice: Subject to any disclaimer, the term of this patent is extended or adjusted under 35 U.S.C. 154(b) by 159 days.

(21) Appl. No.: 13/463,692

(22) Filed: May 3, 2012

(65) Prior Publication Data

US 2013/0297757 A1 Nov. 7, 2013

(51) Int. Cl.
*G06F 15/16* (2006.01)
*H04L 12/701* (2013.01)
*H04L 12/24* (2006.01)

(52) U.S. Cl.
CPC ............... *H04L 41/12* (2013.01); *H04L 45/00* (2013.01)
USPC .......................................... 709/245; 370/255

(58) Field of Classification Search
CPC ..... H04L 12/24; H04L 12/4641; H04L 49/70; H04L 41/12; H04L 41/08; H04L 45/00; H04L 45/02
USPC ............................ 709/245, 208, 209; 370/255
See application file for complete search history.

(56) References Cited

U.S. PATENT DOCUMENTS

| | | | | |
|---|---|---|---|---|
| 6,035,105 | A * | 3/2000 | McCloghrie et al. | 709/236 |
| 2004/0081104 | A1* | 4/2004 | Pan et al. | 370/254 |
| 2007/0036178 | A1* | 2/2007 | Hares et al. | 370/490 |
| 2010/0146176 | A1* | 6/2010 | Beckhoff et al. | 710/110 |
| 2010/0254264 | A1* | 10/2010 | Ford et al. | 370/235 |
| 2012/0063299 | A1* | 3/2012 | Narasimhan et al. | 370/218 |
| 2012/0079474 | A1* | 3/2012 | Gold et al. | 717/173 |
| 2013/0188521 | A1* | 7/2013 | Jain | 370/255 |

* cited by examiner

*Primary Examiner* — Lashonda Jacobs

(57) ABSTRACT

One embodiment of the present invention provides a computing system. The computing system includes a processor, a memory, a discovery mechanism, a switch management mechanism, and a configuration management mechanism. The discovery mechanism discovers a remote switch. The switch management mechanism registers the remote switch and transmits a switch image to the remote switch, thereby allowing the remote switch to install the image. The configuration management mechanism configures the remote switch, thereby allowing the remote switch to be controlled by the computing system.

25 Claims, 16 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  502  | TYPE 504      |  506  |        TOT. LENGTH 508         |
+-+-+-+-+-+-+-+-+-+-+-+-+-+-+-+-+-+-+-+-+-+-+-+-+-+-+-+-+-+-+-+-+
|                          SOURCE ID 510                         |
+-+-+-+-+-+-+-+-+-+-+-+-+-+-+-+-+-+-+-+-+-+-+-+-+-+-+-+-+-+-+-+-+
|                        DESTINATION ID 520                      |
+-+-+-+-+-+-+-+-+-+-+-+-+-+-+-+-+-+-+-+-+-+-+-+-+-+-+-+-+-+-+-+-+
```

FIG. 5A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| OP TYPE 552   | OP LEN 554    |         OP VALUE 556           |
+-+-+-+-+-+-+-+-+-+-+-+-+-+-+-+-+-+-+-+-+-+-+-+-+-+-+-+-+-+-+-+-+
|                       OP VALUE 556 (CONT.)                     |
|                               ...                              |
+-+-+-+-+-+-+-+-+-+-+-+-+-+-+-+-+-+-+-+-+-+-+-+-+-+-+-+-+-+-+-+-+
|                                .                               |
|                                .                               |
|                                .                               |
+-+-+-+-+-+-+-+-+-+-+-+-+-+-+-+-+-+-+-+-+-+-+-+-+-+-+-+-+-+-+-+-+
| OP TYPE 562   | OP LEN 564    |         OP VALUE 566           |
+-+-+-+-+-+-+-+-+-+-+-+-+-+-+-+-+-+-+-+-+-+-+-+-+-+-+-+-+-+-+-+-+
|                       OP VALUE 566 (CONT.)                     |
|                               ...                              |
+-+-+-+-+-+-+-+-+-+-+-+-+-+-+-+-+-+-+-+-+-+-+-+-+-+-+-+-+-+-+-+.....
```

FIG. 5B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| OP TYPE 602   | OP LEN 604    |        OP VALUE 606           |
+-+-+-+-+-+-+-+-+-+-+-+-+-+-+-+-+-+-+-+-+-+-+-+-+-+-+-+-+-+-+-+-+
|                      OP VALUE 606 (CONT.)                     |
|                             ...                               |
+-+-+-+-+-+-+-+-+-+-+-+-+-+-+-+-+-+-+-+-+-+-+-+-+-+-+-+-+-+-+-+-+
|                              .                                |
|                              .                                |
|                              .                                |
+-+-+-+-+-+-+-+-+-+-+-+-+-+-+-+-+-+-+-+-+-+-+-+-+-+-+-+-+-+-+-+-+
| OP TYPE 612   | OP LEN 614    |        OP VALUE 616           |
+-+-+-+-+-+-+-+-+-+-+-+-+-+-+-+-+-+-+-+-+-+-+-+-+-+-+-+-+-+-+-+-+
|                      OP VALUE 616 (CONT.)                     |
|                             ...                               |
+-+-+-+-+-+-+-+-+-+-+-+-+-+-+-+-+-+-+-+-+-+-+-+-+-+-+-+-+-+-+-+.....
```

FIG. 6A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   STATE 652   |FAIL. CODE 654 |          RESERVED 656         |
+-+-+-+-+-+-+-+-+-+-+-+-+-+-+-+-+-+-+-+-+-+-+-+-+-+-+-+-+-+-+-+-+
| OP TYPE 662   | OP LEN 664    |        OP VALUE 666           |
+-+-+-+-+-+-+-+-+-+-+-+-+-+-+-+-+-+-+-+-+-+-+-+-+-+-+-+-+-+-+-+-+
|                      OP VALUE 666 (CONT.)                     |
|                             ...                               |
+-+-+-+-+-+-+-+-+-+-+-+-+-+-+-+-+-+-+-+-+-+-+-+-+-+-+-+-+-+-+-+-+
|                              .                                |
|                              .                                |
|                              .                                |
+-+-+-+-+-+-+-+-+-+-+-+-+-+-+-+-+-+-+-+-+-+-+-+-+-+-+-+-+-+-+-+-+
| OP TYPE 672   | OP LEN 674    |        OP VALUE 676           |
+-+-+-+-+-+-+-+-+-+-+-+-+-+-+-+-+-+-+-+-+-+-+-+-+-+-+-+-+-+-+-+-+
|                      OP VALUE 676 (CONT.)                     |
|                             ...                               |
+-+-+-+-+-+-+-+-+-+-+-+-+-+-+-+-+-+-+-+-+-+-+-+-+-+-+-+-+-+-+-+.....
```

FIG. 6B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       CLI SESSION ID 702                      |
+-+-+-+-+-+-+-+-+-+-+-+-+-+-+-+-+-+-+-+-+-+-+-+-+-+-+-+-+-+-+-+-+
| CF 704| CT 706|            CLI DATA 708                       |
+-+-+-+-+-+-+-+-+-+-+-+-+-+-+-+-+-+-+-+-+-+-+-+-+-+-+-+-+-+-+-+.....+
```

FIG. 7A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       CLI SESSION ID 702                      |
+-+-+-+-+-+-+-+-+-+-+-+-+-+-+-+-+-+-+-+-+-+-+-+-+-+-+-+-+-+-+-+-+
| CF 704| CT 706| CS 712|        CLI REPLY DATA 720             |
+-+-+-+-+-+-+-+-+-+-+-+-+-+-+-+-+-+-+-+-+-+-+-+-+-+-+-+-+-+.....+
```

FIG. 7B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|802|804| D. SUBTYPE 806|          RESERVED 808                 |
+-+-+-+-+-+-+-+-+-+-+-+-+-+-+-+-+-+-+-+-+-+-+-+-+-+-+-+-+-+-+-+-+
|                    TRANSACTION ID 810                         |
+-+-+-+-+-+-+-+-+-+-+-+-+-+-+-+-+-+-+-+-+-+-+-+-+-+-+-+-+-+-+-+-+
|                   DATA SEQ. NUMBER 812                        |
+-+-+-+-+-+-+-+-+-+-+-+-+-+-+-+-+-+-+-+-+-+-+-+-+-+-+-+-+-+-+-+-+
```

FIG. 8A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|822|824| D. SUBTYPE 826|  TB. TYPE 828  |TB. SUBTYPE 830|  832 |
+-+-+-+-+-+-+-+-+-+-+-+-+-+-+-+-+-+-+-+-+-+-+-+-+-+-+-+-+-+-+-+-+
|TB. IN. NO. 834|           TOTAL TABLE ENTRIES 836             |
+-+-+-+-+-+-+-+-+-+-+-+-+-+-+-+-+-+-+-+-+-+-+-+-+-+-+-+-+-+-+-+-+
|                    TRANSACTION ID 838                         |
+-+-+-+-+-+-+-+-+-+-+-+-+-+-+-+-+-+-+-+-+-+-+-+-+-+-+-+-+-+-+-+-+
|                   DATA SEQ. NUMBER 840                        |
842 +-+-+-+-+-+-+-+-+-+-+-+-+-+-+-+-+-+-+-+-+-+-+-+-+-+-+-+-+-+-+-+-+
   |                        TB. INDEX 1                         |
   +-+-+-+-+-+-+-+-+-+-+-+-+-+-+-+-+-+-+-+-+-+-+-+-+-+-+-+-+-+-+-+-+
   |                          ......                            |
844 +-+-+-+-+-+-+-+-+-+-+-+-+-+-+-+-+-+-+-+-+-+-+-+-+-+-+-+-+-+-+-+-+
   |                        TB. INDEX n                         |
   +-+-+-+-+-+-+-+-+-+-+-+-+-+-+-+-+-+-+-+-+-+-+-+-+-+-+-+-+-+-+-+-+
   |     TB. ENTRY 1 LENGTH 846    |    TB. ENTRY 1 VALUE 850   |
   +-+-+-+-+-+-+-+-+-+-+-+-+-+-+-+-+-+-+-+-+-+-+-+-+-+-+-+-+-+-+-+...+
   |                          ......                            |
   +-+-+-+-+-+-+-+-+-+-+-+-+-+-+-+-+-+-+-+-+-+-+-+-+-+-+-+-+-+-+-+...+
   |     TB. ENTRY n LENGTH 848    |    TB. ENTRY n VALUE 852   |
   +-+-+-+-+-+-+-+-+-+-+-+-+-+-+-+-+-+-+-+-+-+-+-+-+-+-+-+-+-+-+-+...+
```

FIG. 8B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                     DATA TOTAL LENGTH 862                     |
+-+-+-+-+-+-+-+-+-+-+-+-+-+-+-+-+-+-+-+-+-+-+-+-+-+-+-+-+-+-+-+-+
|802|854| D. SUBTYPE 806|           RESERVED 808                |
+-+-+-+-+-+-+-+-+-+-+-+-+-+-+-+-+-+-+-+-+-+-+-+-+-+-+-+-+-+-+-+-+
|                      TRANSACTION ID 810                       |
+-+-+-+-+-+-+-+-+-+-+-+-+-+-+-+-+-+-+-+-+-+-+-+-+-+-+-+-+-+-+-+-+
|                      DATA SEQ. NUMBER 812                     |
+-+-+-+-+-+-+-+-+-+-+-+-+-+-+-+-+-+-+-+-+-+-+-+-+-+-+-+-+-+-+-+-+
|                           DATA 864                            |
+-+-+-+-+-+-+-+-+-+-+-+-+-+-+-+-+-+-+-+-+-+-+-+-+-+-+-+-+-+-+...+
```

FIG. 8C

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                     DATA TOTAL LENGTH 872                     |
+-+-+-+-+-+-+-+-+-+-+-+-+-+-+-+-+-+-+-+-+-+-+-+-+-+-+-+-+-+-+-+-+
|822|856| D. SUBTYPE 826| TB. TYPE 828   |TB. SUBTYPE 830| OC 874|
+-+-+-+-+-+-+-+-+-+-+-+-+-+-+-+-+-+-+-+-+-+-+-+-+-+-+-+-+-+-+-+-+
|TB. IN. NO. 834|          TOTAL TABLE ENTRIES 836              |
+-+-+-+-+-+-+-+-+-+-+-+-+-+-+-+-+-+-+-+-+-+-+-+-+-+-+-+-+-+-+-+-+
|                      TRANSACTION ID 838                       |
+-+-+-+-+-+-+-+-+-+-+-+-+-+-+-+-+-+-+-+-+-+-+-+-+-+-+-+-+-+-+-+-+
|                      DATA SEQ. NUMBER 840                     |
842 +-+-+-+-+-+-+-+-+-+-+-+-+-+-+-+-+-+-+-+-+-+-+-+-+-+-+-+-+-+-+-+-+
|                          TB. INDEX 1                          |
+-+-+-+-+-+-+-+-+-+-+-+-+-+-+-+-+-+-+-+-+-+-+-+-+-+-+-+-+-+-+-+-+
|                            ......                             |
844 +-+-+-+-+-+-+-+-+-+-+-+-+-+-+-+-+-+-+-+-+-+-+-+-+-+-+-+-+-+-+-+-+
|                          TB. INDEX n                          |
+-+-+-+-+-+-+-+-+-+-+-+-+-+-+-+-+-+-+-+-+-+-+-+-+-+-+-+-+-+-+-+-+
|      TB. ENTRY 1 LENGTH 846     |    TB. ENTRY 1 VALUE 850    |
+-+-+-+-+-+-+-+-+-+-+-+-+-+-+-+-+-+-+-+-+-+-+-+-+-+-+-+-+-+-+...+
|     TB. ENTRY 1 CTX LENGTH 876  |  TB. ENTRY 1 CTX VALUE 880  |
+-+-+-+-+-+-+-+-+-+-+-+-+-+-+-+-+-+-+-+-+-+-+-+-+-+-+-+-+-+-+...+
|                            ......                             |
+-+-+-+-+-+-+-+-+-+-+-+-+-+-+-+-+-+-+-+-+-+-+-+-+-+-+-+-+-+-+...+
|      TB. ENTRY n LENGTH 848     |    TB. ENTRY n VALUE 852    |
+-+-+-+-+-+-+-+-+-+-+-+-+-+-+-+-+-+-+-+-+-+-+-+-+-+-+-+-+-+-+...+
|     TB. ENTRY n CTX LENGTH 878  |  TB. ENTRY n CTX VALUE 882  |
+-+-+-+-+-+-+-+-+-+-+-+-+-+-+-+-+-+-+-+-+-+-+-+-+-+-+-+-+-+-+...+
```

FIG. 8D

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|802|804| D. SUBTYPE 806|           RESERVED 808                |
+-+-+-+-+-+-+-+-+-+-+-+-+-+-+-+-+-+-+-+-+-+-+-+-+-+-+-+-+-+-+-+-+
|                     TRANSACTION ID 810                        |
+-+-+-+-+-+-+-+-+-+-+-+-+-+-+-+-+-+-+-+-+-+-+-+-+-+-+-+-+-+-+-+-+
|                     DATA SEQ. NUMBER 812                      |
+-+-+-+-+-+-+-+-+-+-+-+-+-+-+-+-+-+-+-+-+-+-+-+-+-+-+-+-+-+-+-+-+
```

FIG. 8E

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|822|824| D. SUBTYPE 826| TB. TYPE 828  |TB. SUBTYPE 830| OC 874|
+-+-+-+-+-+-+-+-+-+-+-+-+-+-+-+-+-+-+-+-+-+-+-+-+-+-+-+-+-+-+-+-+
|                     TRANSACTION ID 838                        |
+-+-+-+-+-+-+-+-+-+-+-+-+-+-+-+-+-+-+-+-+-+-+-+-+-+-+-+-+-+-+-+-+
|                     DATA SEQ. NUMBER 840                      |
+-+-+-+-+-+-+-+-+-+-+-+-+-+-+-+-+-+-+-+-+-+-+-+-+-+-+-+-+-+-+-+-+
```

FIG. 8F

UNITED ROUTER FARM SETUP

BACKGROUND

1. Field

The present disclosure relates to network management. More specifically, the present disclosure relates to a method and system for network virtualization using a centralized point of control.

2. Related Art

The relentless growth of the Internet has brought with it an insatiable demand for bandwidth. As a result, equipment vendors race to build larger, faster, and more versatile routers to move traffic, especially in the core networks. In a traditional mode of operation, such a router has a control plane and a data plane. The router is typically controlled by local software which implements the control and data planes. The router communicates with other routers through predefined protocols. The control plane configures the forwarding information on the router and distributes control information (e.g., routing cost), and the data plane forwards data packets according to the forwarding information. However, each individual router requires tedious and complex configuration, typically performed by a network administrator. Hence, accessing and configuring such information remotely and automatically can improve the management of a router, thereby addressing one of the most challenging problems in today's networking paradigm.

Remotely gaining access to a router's control plane via a network can address some aspects of this problem. For example, OpenFlow is a protocol that allows configuring some routing policies, such as a network path, by software running on a separate server. However, OpenFlow only defines the flow table message for an OpenFlow switch, and does not provide sufficient infrastructure to control a router completely. For example, all possible messages between the software and a switch are not defined. Furthermore, an OpenFlow control plane is completely centralized. Consequently, it cannot utilize distributed protocols for better performance.

Hence, while remotely configuring network paths on a router brings many desirable features to layer-3 networks, some issues remain unsolved for network virtualization.

SUMMARY

One embodiment of the present invention provides a computing system. The computing system includes a processor, a memory, a discovery mechanism, a switch management mechanism, and a configuration management mechanism. The discovery mechanism discovers a remote switch. The switch management mechanism registers the remote switch and transmits a switch image to the remote switch, thereby allowing the remote switch to install the image. The configuration management mechanism configures the remote switch, thereby allowing the remote switch to be controlled by the computing system.

In a variation on this embodiment, the switch management mechanism registers the remote switch based on a received layer-2 frame, and wherein the transmission of the switch image and subsequent configuration of the remote switch are done over layer-3.

In a variation on this embodiment, the switch management mechanism also transmits an updated switch image for installation in the remote switch.

In a variation on this embodiment, the switch management mechanism also assigns a layer-3 network address to the remote switch.

In a further variation on this embodiment, the switch management mechanism also establishes a Transmission Control Protocol (TCP) connection with the remote switch using the layer-3 network address.

In a variation on this embodiment, the configuration management mechanism also sends forwarding information to the remote switch, wherein the forwarding information is specific to the remote switch.

In a variation on this embodiment, the configuration management mechanism also sends a Virtual Local Area Network (VLAN) identifier to the remote switch, wherein an interface coupling the computing system to the remote switch is configured with the VLAN identifier.

In a variation on this embodiment, the switch management mechanism also determines whether the remote switch is active.

In a variation on this embodiment, the computing system also includes a data management mechanism which exchanges specific elements of tabular data with the remote switch, wherein the tabular data is present in the computing system and the remote switch.

One embodiment of the present invention provides a switch. The switch includes a discovery mechanism, a switch management mechanism, and a configuration management mechanism. The discovery mechanism discovers a remote configuring system. The switch management mechanism registers the switch with the remote configuring system and receives a switch image from the configuring system. The configuration management mechanism configures the switch based on received configuration information from the configuring system, thereby allowing the configuring system to control the switch.

In a variation on this embodiment, the switch management mechanism registers with the configuring system based on a received layer-2 frame, and wherein the reception of the switch image and subsequent configuration of the switch are done over layer-3.

In a variation on this embodiment, the switch management mechanism also installs the switch image received from the configuring system.

In a variation on this embodiment, the configuration management mechanism also operates as a backup configuring system if the configuring system becomes unavailable.

In a variation on this embodiment, the configuration management mechanism also updates local forwarding information based on the received forwarding information from the configuring system.

In a variation on this embodiment, the configuration management mechanism also receives a layer-3 network address and a Virtual Local Area Network (VLAN) identifier from the configuring system.

In a further variation on this embodiment, the configuration management mechanism also configures an interface coupling the switch to the configuring system using the VLAN identifier and creates a virtual interface using the layer-3 network address and the VLAN identifier.

In a variation on this embodiment, the switch management mechanism is also determines whether the configuring system is active.

In a variation on this embodiment, the switch also includes a data management mechanism which exchanges specific elements of tabular data with the configuring system, wherein the tabular data is present in the configuring system and the switch.

BRIEF DESCRIPTION OF THE FIGURES

FIG. 5A illustrates a master-slave control (MSC) message header format, in accordance with an embodiment of the present invention.

FIG. 5B illustrates a master hello message format, in accordance with an embodiment of the present invention.

FIG. 6A illustrates a slave registration message format, in accordance with an embodiment of the present invention.

FIG. 6B illustrates a slave registration reply message format, in accordance with an embodiment of the present invention.

FIG. 7A illustrates a command line interface (CLI) message format, in accordance with an embodiment of the present invention.

FIG. 7B illustrates a CLI reply message format, in accordance with an embodiment of the present invention.

FIG. 8A illustrates a raw data query message format, in accordance with an embodiment of the present invention.

FIG. 8B illustrates a structured data query message format, in accordance with an embodiment of the present invention.

FIG. 8C illustrates a raw data report message format, in accordance with an embodiment of the present invention.

FIG. 8D illustrates a structured data report message format, in accordance with an embodiment of the present invention.

FIG. 8E illustrates a raw data report reply message format, in accordance with an embodiment of the present invention.

FIG. 8F illustrates a structured data report reply message format, in accordance with an embodiment of the present invention.

DETAILED DESCRIPTION

Figure 1A:
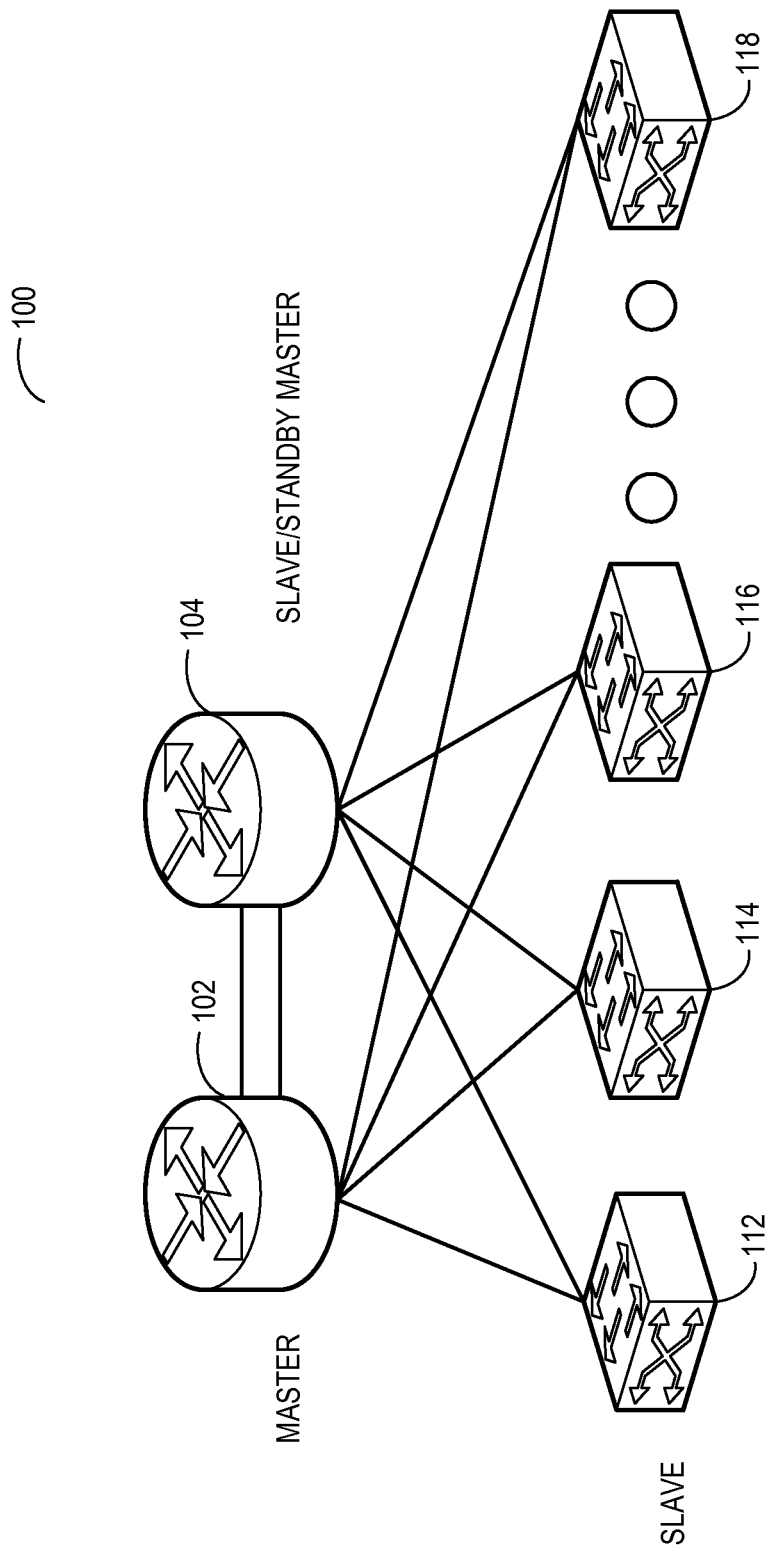
FIG. 1A illustrates an exemplary United Router Farm (URF) in a hub-spoke topology, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of remotely configuring a large number of routers is solved by controlling these routers remotely as a virtualized network. A respective router communicates with other routers in the group through preconfigured protocols and is controlled by software residing locally. Managing such a group of routers in a traditional network is complex because a respective router requires individual configuration. To solve this problem, a composite network, called a united router farm (URF), with an arbitrary number of routers or switches is created and virtualized as one logical router or switch.

A URF can be considered as a network virtualization technology which enables a group of routers to virtually appear as one logical router without changing any service provided to a respective router. The virtualization essentially offloads the control plane of all routers in the URF to a unified location and provides a new single point of control and management. A URF thereby reduces the burden of managing every router individually. Such a unified management location can be on any router in the URF or an external network management system (e.g., a server). The router or server which provides the central point of control and management can be referred to as the master node, while all other routers or switches in the URF can be referred to as slave nodes. This mode of operation is referred to as a master-slave mode.

In some embodiments, under the master-slave mode, a URF can have a plurality of master nodes. During regular operation, only one such node operates as the master node in the URF, while the others work as slave nodes and remain standby. If the master node fails, one of the standby master nodes becomes the master node for the URF. The master nodes in a URF can be of different types. For example, one of the master nodes in a URF can be a router, while another one can be a server. In some embodiments, a URF can include one or more aggregation routers, wherein one of the aggregation routers acts as the master node, while others act as slave nodes. The rest of the routers in a URF can be access switches acting as slave nodes. In a traditional network, access switches only provide layer-2 switching, whereas aggregation routers provide both layer-2 switching and layer-3 routing services. However, after the virtualization (i.e., after forming the URF), the URF provides both layer-2 and layer-3 services as a whole. Consequently, any packet received by an access switch can receive both layer-2 and layer-3 services from the URF.

A master node in a URF controls the slave nodes. A master image installed on a node operates the node as a master node. Note that the master node image is typically installed by a system administrator on the master node. On the other hand, a respective slave node typically has a basic slave image preinstalled for enabling the slave node to join the URF. A way to remotely control a slave node from a master node is referred to as a master-slave control (MSC) basic method. The MSC method is responsible for the master and slave node discovery. Through the discovery process, a slave node can automatically discover the master node after plugging in to the URF network. After the discovery, the slave node registers with the master node. During this process, the slave node sends a registration message to the master node. Upon receiving the message, the master node checks whether the slave node is acceptable for the URF. Once the master node determines that the slave node is acceptable, the master node decides what image the slave node can run (referred to as a slave image), configures the image, and sends the image to the slave node. After receiving the image, the slave node installs the slave image. In this way, the master node then takes full control of the slave node after the slave node joins the URF. The control includes all configuration and monitoring for the slave node.

In addition, the master node periodically checks whether the slave node is alive (i.e., operational). The slave node does the same for the master node. The time period of this process can be different for the master and the slave node. The master and the slave node can also exchange data. Such data exchanges can be used for the master node to control the slave node, and for the slave node to report its status or data to the master node. The exchanged data includes but not is limited to the following categories: 1) network topology and other tables reporting from the slave node to the master node; 2) forwarding table and other control tables downloaded from the master node to the slave node; 3) link and node states reporting from the slave node to the master node; and 4) statistics reporting from the slave node to the master node.

In this disclosure, the terms "switch" and "router" are used interchangeably, and refer to any device forwarding traffic in a network. The terms should not be interpreted as being limited to a layer-2 or layer-3 network. The term "node" is used in a generic sense and can refer to a switch or a router.

In this disclosure, the terms "master" and "slave" are used in a generic sense. Any entity in a network which controls other network entities can be referred to as a master node. Similarly, any entity in a network which is controlled by another network entity can be referred to as a slave node. The terms "master" and "master node," and "slave" and "slave node" are used interchangeably, respectively.

The term "image" refers to data stored in a nonvolatile and distributable form which represents the contents of a computing device or software controlling the computing device (e.g., an operating system). In this disclosure, any data or software that can operate a network switch or router and can be distributed across a network can be referred to as an image. The image can simply be one or more files that can contain an operating system, executable programs, and any data files that might be related to the operating system and programs.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

The term "network address" refers to an identifier that can identify a device in a network. A "network address" should not be interpreted as limiting embodiments of the present invention to IP network addresses. "Network address" can be replaced by other terminologies referring to an identifier of a device in a network, such as "name" or "identifier."

Network Architecture

FIG. 1A illustrates an exemplary United Router Farm (URF) in a hub-spoke topology, in accordance with an embodiment of the present invention. URF 100 includes a master node 102 and a standby master node 104. Both nodes 102 and 104 are configured to operate as a master node, but only node 102 acts as the master node for URF 100. In some embodiments, a priority value is assigned to nodes 102 and 104, and the node with higher value acts as the master while the other remains standby. In this example, node 102 has the highest priority value. During operation, if node 102 encounters a failure, node 104 start operating as a master node. URF 100 also includes a large number of slave nodes 112, 114, 116, and 118. A respective slave node is coupled to both nodes 102 and 104. In some embodiments, nodes 102 and 104 are aggregation routers with layer-3 routing capability while nodes 112, 114, 116, and 118 are layer-2 access switches. URF 100 can be presented as one logical layer-3 router to the rest of the network. Because of the combination of aggregation and access switches, URF 100, as a logical router, can operate in both layer-2 and layer-3. Note that a master node image is typically installed on nodes 102 and 104 by a system administrator. On the other hand, a respective slave node, such as node 112, typically has a basic slave image preinstalled for enabling node 112 to join URF 100.

During operation, master node 102 in URF 100 remotely controls slave node 112 using the MSC method. During operation, master node 102 first discovers slave node 112. The discovery can be initiated from either master node 102 or slave node 112. If initiated by the master node 102, after plugging in to URF 100, slave node 112 receives a hello message, and discovers the URF. If initiated by the slave node 112, after plugging in to URF 100, slave node 112 sends a master query broadcast message, receives a query reply message from master node 102, and discovers master node 102 in the URF. After the discovery, slave node 112 registers with master node 102. During this registration process, slave node 112 sends a registration message to master node 102. Upon receiving the message, master node 102 checks whether slave node 112 is acceptable for the URF. In some embodiments, master node 102 determines the acceptability by checking whether slave node 112 is equipped with a basic slave switch image. Once master node 102 determines that slave node 112 is acceptable, master node 102 decides what slave image slave node 112 can run, configures the image, and sends the image to slave node 112. For example, if slave node 112 is already running an image and requires an upgrade, master node 102 configures an upgraded image and sends the image to slave node 112. After receiving the image, slave node 112 installs the image locally. On the other hand, if the image is current and does not need any upgrade, master node 102 does not send any slave image to slave node 112. Once the installed slave image is current, master node 102 then configures slave node 112, and continues to control and monitor slave node 112 as long as slave node 112 is a part of URF 100.

Similarly, master node 102 registers and configures slave nodes 114, 116, and 118 as well. In addition, master node 102 periodically checks whether the slave nodes are alive. A respective slave node also periodically checks whether master node 102 is alive. During operation, if node 104 detects that master node 102 is not alive, node 104 starts operating as the master node for URF 100. Slave nodes 112, 114, 116, and 118 then register with master node 104. Master node 104 then updates the configuration of the slave nodes. The master node, however, may or may not upgrade the image of the slave nodes. Master node 102 can also exchange data with the slave nodes. Such data exchanges can be used for master node 102 to control slave nodes, and for a respective slave node, such as slave node 112, to report status or data to master node 102.

Figure 1B:
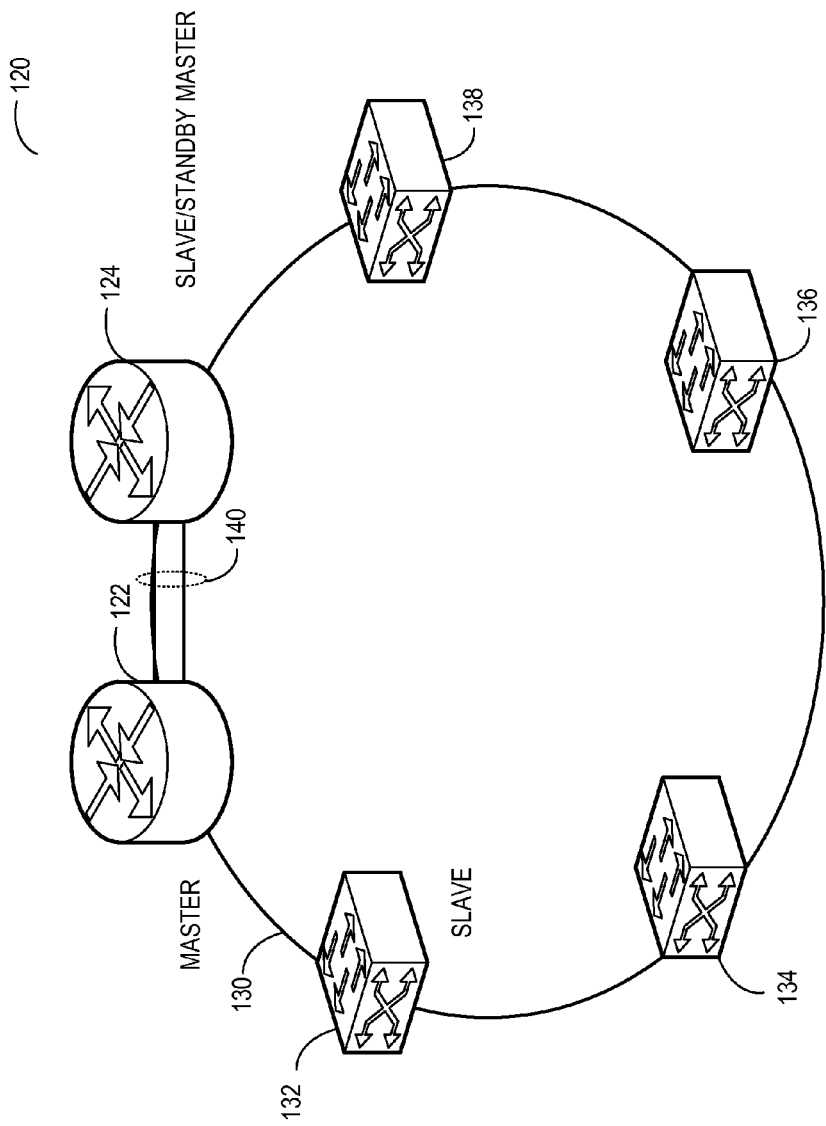
FIG. 1B illustrates an exemplary URF in a ring topology, in accordance with an embodiment of the present invention.

The network topology of a URF is typically designed to meet the service requirements of the whole URF and achieve the desired performance, availability, and scalability from the network. Hence, a URF can have different topologies, depending on design and implementation. FIG. 1B illustrates an exemplary URF in a ring topology, in accordance with an embodiment of the present invention. In this example, URF 120 includes a master node 122, a standby master node 124, and slave nodes 132, 134, 136, and 138. All nodes in URF 120 are coupled to each other via a ring 130. Because node 124 is the standby master node, nodes 122 and 124 are coupled to each other via multiple links 140. In some embodiments, one of the links 140 is used as a part of ring topology 130, while the other ones are used to update the master node states on node 124. In this way, node 124 remains prepared to take over the operations of node 122 in a failure scenario without interrupting regular traffic in URF 120. Though ring 130 is shown using a single line, it can consist of multiple parallel rings, designed to resume operation in case of a link failure.

Figure 1C:
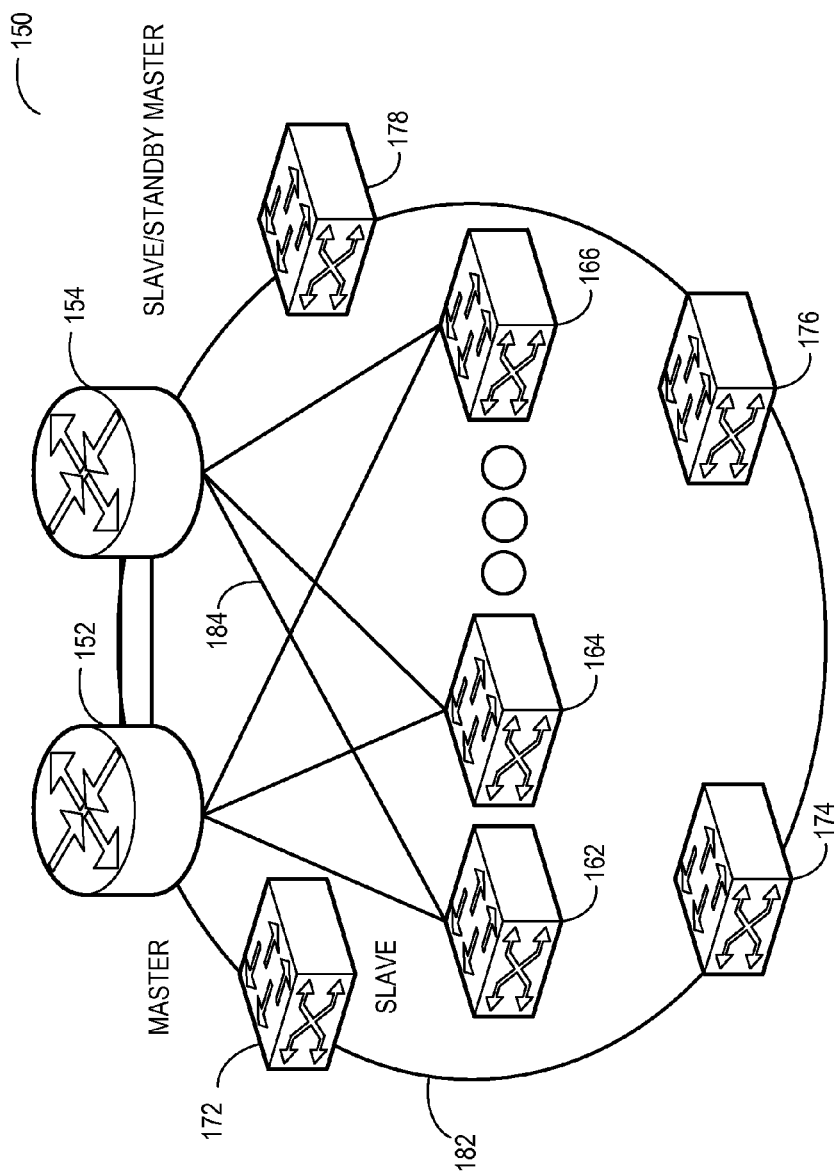
FIG. 1C illustrates an exemplary URF in a hybrid topology, in accordance with an embodiment of the present invention.
Figure 1D:
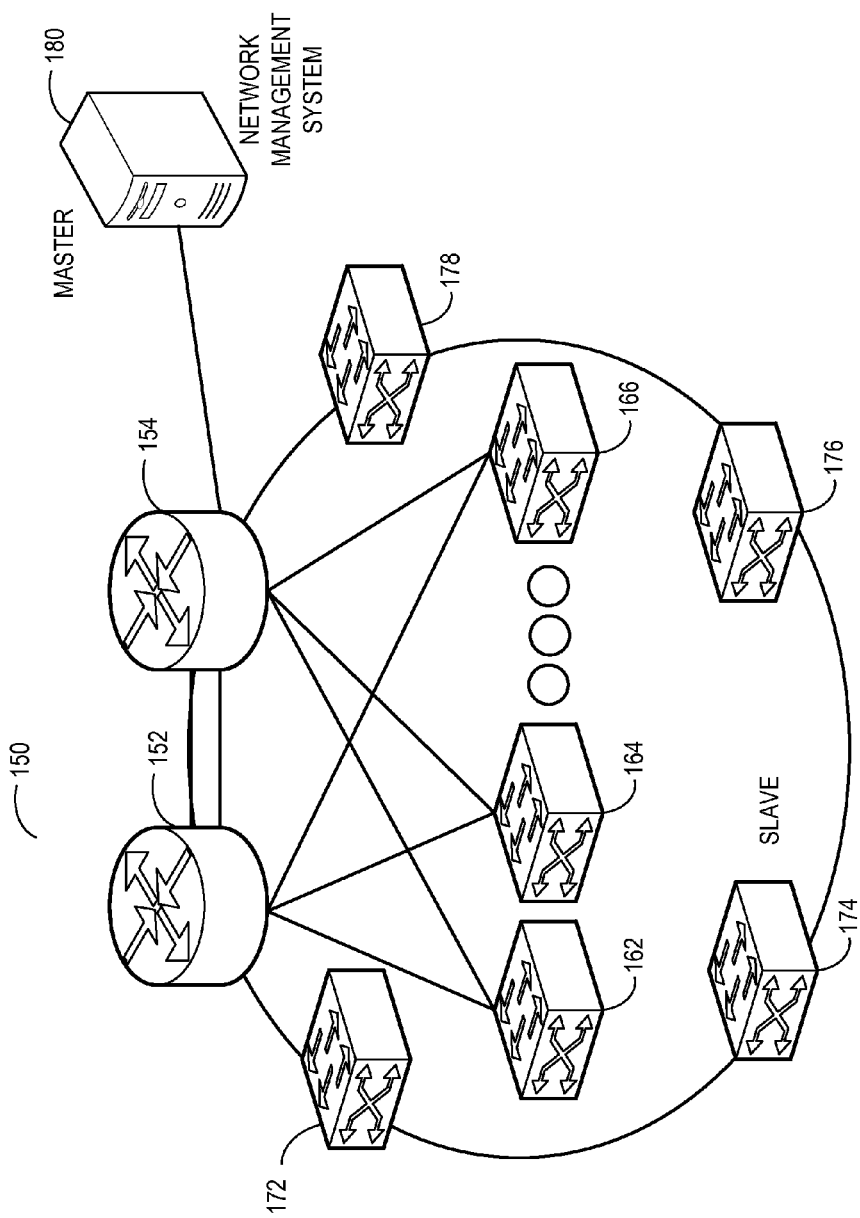
FIG. 1D illustrates an exemplary URF controlled by a network management system, in accordance with an embodiment of the present invention.

FIG. 1C illustrates an exemplary URF in a hybrid topology, in accordance with an embodiment of the present invention. In this example, URF 150 includes a master node 152 and a standby master node 154 acting as a slave node. Slave nodes 172, 174, 176, and 178 are coupled to nodes 152 and 154 in a ring topology 182. Moreover, slave nodes 162, 164, and 166 are coupled to nodes 152 and 154 in a spur topology. FIGS. 1A-1C illustrate that, irrespective of the topology, a URF has one master node which virtualizes the URF as one logical router, and configures and controls the rest of the nodes in the URF. In some embodiments, the master node can be a separate network management system. FIG. 1D illustrates an exemplary URF controlled by a network management system, in accordance with an embodiment of the present invention. All nodes in FIG. 1D are the same as in FIG. 1C, so the same numerals are used to denote them. In this example, network management system 180 operates as the master node for URF 150 while nodes 152 and 154 act as standby master nodes. Network management system 180 may not participate in the data plane of URF 150 or forward data packets. However, system 180 manages the control plane and controls the nodes in URF 150.

United Router Farm Formation

To form a URF, a system administrator can configure a master node. The administrator can optionally configure additional standby master nodes as well. Whenever a slave node joins the URF, the master node exchanges MSC messages with the slave node to register and configure the slave node. In this way, a large number of slave nodes can join the URF, thereby forming the URF using the MSC method. At the different stages of the MSC method, a combination of layer-2 (e.g., Ethernet) and layer-3 (e.g., Internet Protocol (IP)) communication is used for the message exchange. For IP-based communication, the MSC messages can be transported either using Transmission Control Protocol (TCP) or User Datagram Protocol (UDP). During the initial stages of the message exchanges (e.g., registration messages), a slave node communicates with the master node using layer-2 frames until the slave node is accepted as a member of the URF. Thereafter, depending on the transportation mode of the slave node, either layer-2 or layer-3 communication is used for the transportation of all MSC messages.

Figure 2:
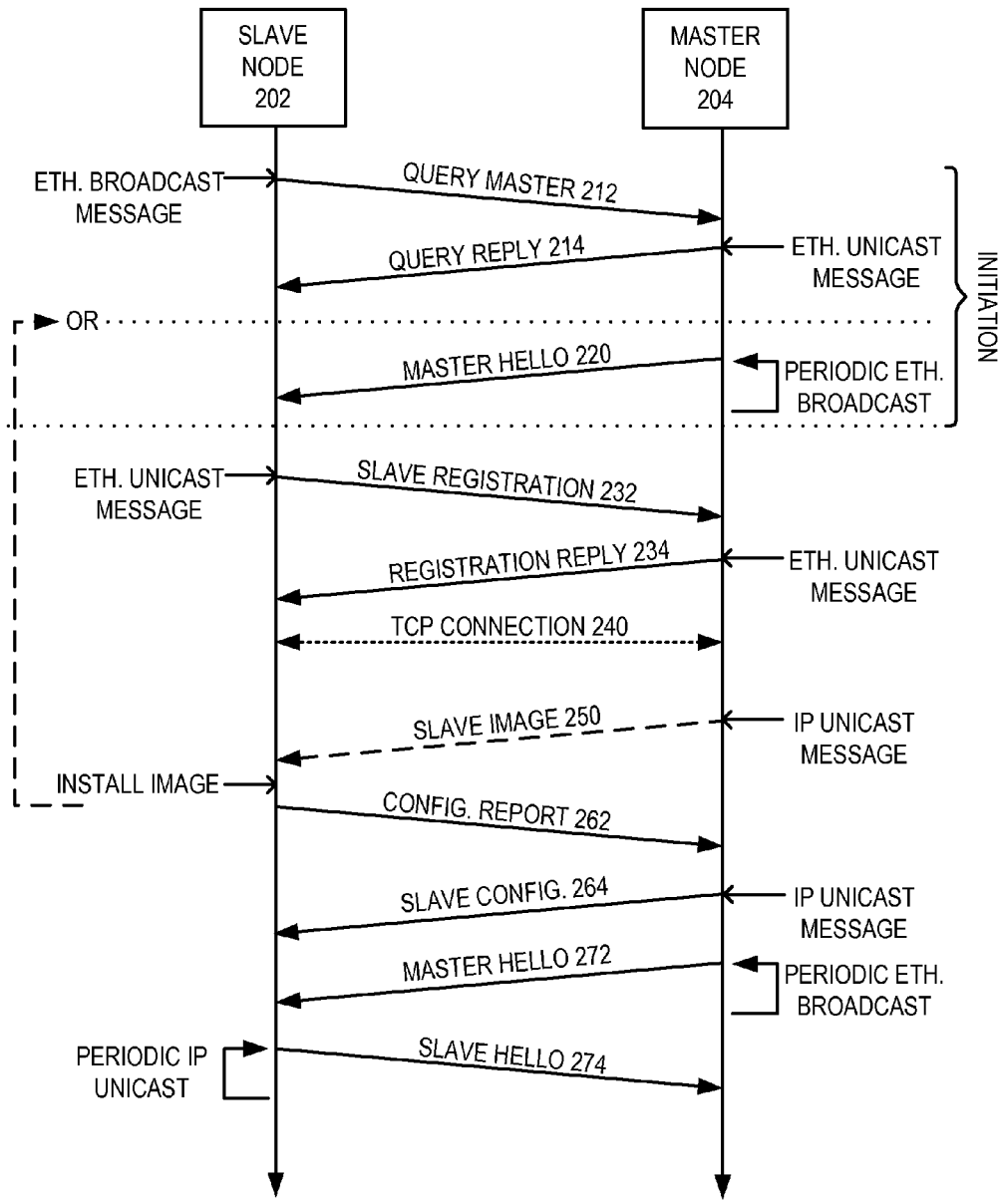
FIG. 2 illustrates an exemplary communication for a slave node registering with a master node, in accordance with an embodiment of the present invention.

FIG. 2 illustrates an exemplary communication for a slave node registering with a master node, in accordance with an embodiment of the present invention. During operation, a slave node 202 registers with a master node 204. If the registration process is initiated by slave node 202, it broadcasts a query master message 212 in a URF via Ethernet. Upon receiving the message, master node 204 learns a layer-2 address of the slave node and sends a query reply message 214 via Ethernet unicast. On the other hand, master node 204 periodically broadcasts a hello message 220 in the URF via Ethernet. If slave node 202 receives hello message 220 before sending query master message 212, the registration process is considered to have been initiated by master node 204.

When slave node 202 receives either query reply message 214 or master hello message 220, slave node 202 learns the layer-2 address of master node 204 and sends a slave registration message 232 to master node 204 via Ethernet unicast. Upon receiving slave registration message 232, master node 204 sends a registration reply message 234 containing an IP address for slave node 202 via Ethernet unicast. Master node 204 can also include a Virtual Local Area Network (VLAN) identifier in message 234. Master node 204 can optionally establish a TCP connection 240 with slave node 202. Depending on the current slave image in slave node 202, master node 204 sends a slave image 250 to slave node 202 via IP unicast. Upon receiving the image, slave node 202 installs the image, reboots, and initiates the registration process again. However, if the image does not require installation or updating, slave node 202 reports its current configuration to master node 204 via configuration report message 262 (which can also be a data report message) via IP unicast. Upon receiving the message, master node 204 sends a configuration to slave node 202 in slave configuration message 264 via IP unicast. Master node 204 also periodically broadcasts a hello message 272 in the URF via Ethernet to notify all slave nodes that it is alive. Similarly, slave node 202 periodically sends a hello message 274 via IP unicast to master node 204 to notify master node 204 that slave node 202 is alive.

Figure 3A:
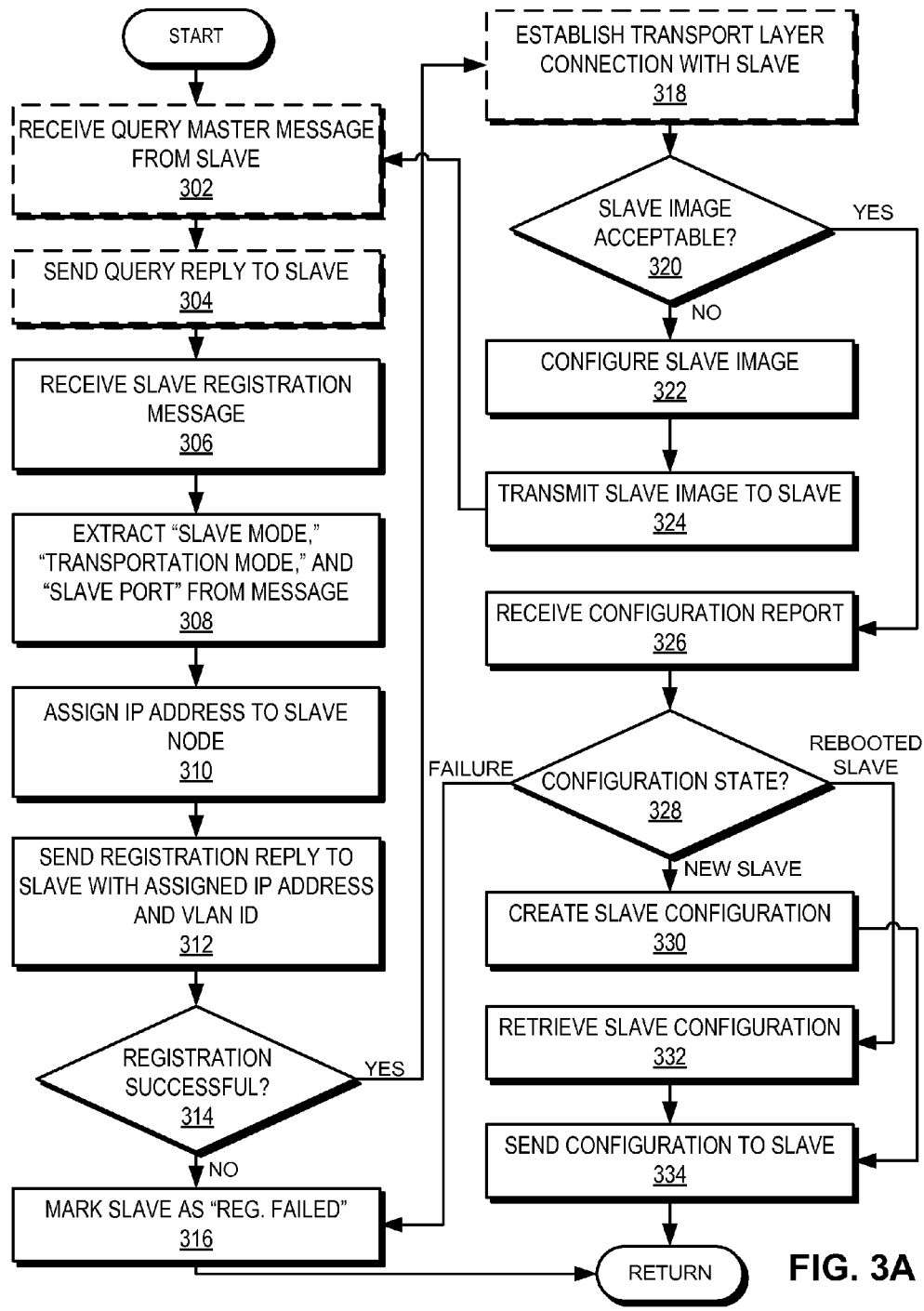
FIG. 3A presents a flowchart illustrating the process of a master node registering a slave node, in accordance with one embodiment of the present invention.

FIG. 3A presents a flowchart illustrating the process of a master node registering a slave node, in accordance with one embodiment of the present invention. The master node can optionally receive a query master message from a slave node (operation 302) and send a query reply to the slave node (operation 304) to initiate the registration process, as described in conjunction with FIG. 2. Once the registration process is initiated, the master node receives a slave registration message from the slave node (operation 306) and extracts the "slave mode," "transportation mode," and "slave port" from the registration message (operation 308). The slave mode specifies whether the slave node is a standby master node. The transportation mode specifies the preferred transportation mode (e.g., TCP or UDP) for the slave node. The slave port is a port number used by the master node to set up a TCP connection with the slave node or as the destination port number for UDP packets.

The master node assigns then an IP address to the slave node (operation 310) and sends a registration reply message containing the IP address (operation 312). The master node can also include a VLAN identifier in the reply message. All nodes in the URF are members of the VLAN and all internal ports on the nodes (i.e., ports used for communication among nodes in the URF) are configured with the VLAN identifier. The master node then determines whether the registration is successful (operation 314). The master node can determine this by checking whether the slave node has successfully assigned the IP address and configured internal ports with the VLAN identifier. If the registration is successful, depending on the transportation mode of the slave node, the master node can optionally establish a transport layer connection (i.e., a TCP connection) with the slave node (operation 318).

The master node then checks whether the slave image on the slave node is acceptable (operation 320). A slave image is not acceptable when the image is the basic version (i.e., for a new slave node) or requires an upgrade. If the image is not acceptable, the master node configures a slave image for the slave node (operation 322) and sends the slave image to the slave node (operation 324). Depending on the transportation mode of the slave node, the master node can send the image via Ethernet, TCP, or UDP communication. If the slave image is acceptable, the master node receives a report from the slave node with current configuration (operation 326) and checks the configuration state of the slave node (operation 328).

If the configuration state indicates that the node is a new slave node, the master node creates a slave configuration for the slave node (operation 330). If the configuration state indicates that the node is a rebooted slave node (e.g., an updated image is installed in the slave node), the master node retrieves the existing configuration for the slave node (operation 332). Once the slave configuration is prepared (operation 330 or 332), the master node sends the configuration to the slave node (operation 334). If the registration is not successful (operation 314) or the configuration state indicates a failure (operation 328), the master node marks the slave node as "registration failed" (operation 316). The state information of the master node can indicate a failure when the master node cannot synchronize configuration states with the slave node.

Figure 3B:
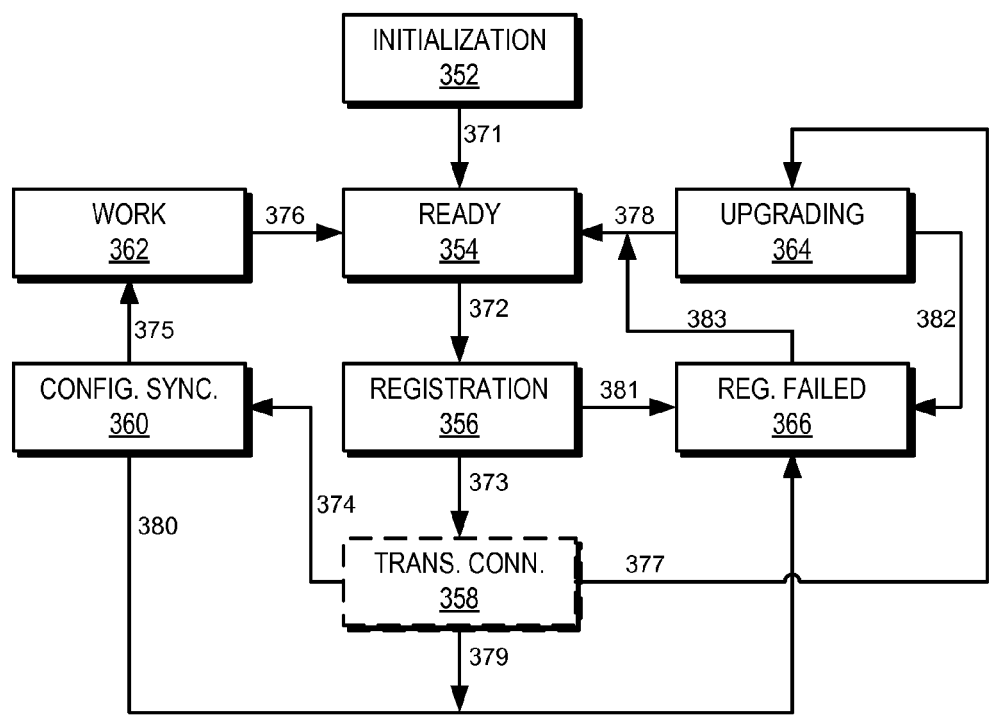
FIG. 3B presents a state diagram of a master node registering a slave node, in accordance with one embodiment of the present invention.

FIG. 3B presents a state diagram of a master node registering a slave node, in accordance with one embodiment of the present invention. The states at the master node include "global states" and "per slave node states." Global states are defined globally for a master node, while the per slave node states are defined for a respective slave node controlled by the master node. Global states include "initialization" and "ready" states, and per slave node states include "registration," "registration failed," "upgrading," "configuration synchronization," "work," and optionally, "transport-layer connection" states.

- Initialization (global) 352: the master node is in this state before it is ready to advertise a master hello message to the whole URF and register slave nodes. This state indicates that the master node is booting up and initializing itself but has not completed the process.
- Ready (global) 354: the master node transits to this state after the initialization is finished. At this state, the master node can periodically broadcast master hello message receive "query master" messages, and send "query reply" messages in response to "query master" messages. The master node transits back to this state when: 1) a slave node is rebooted by the master node; 2) a slave node's slave hello message is not received for a period of time; and 3) an instance of a slave node is removed.
- Registration (per slave) 356: the master node transits to this state after the master node receives a slave registration message and before the message is processed. This state is dedicated to the slave node from which the message is received. Depending on the response to the registration message, the master node can transit to the "upgrading" state, "configuration sync" state, or "registration failed" state.
- Transport-layer connection (per slave) 358: the master node transits to this state only for a slave node with a "transportation mode" set to TCP. At this state, the master node sets up a TCP connection with the slave node based on a port number given in the slave registration message. The three-way handshake for the TCP connection is initialized by the master node.
- Registration failed (per slave) 366: the master node transits to this state when a failure occurs during registration, TCP connection setup, or configuration synchronization. The master node transits out of this state only when the corresponding slave node reboots or leaves the URF.
- Upgrading (per slave) 364: the master node transits to this state when slave registration is successful (and for a TCP transportation mode, a TCP connection is established with the slave node), but the current slave image on the slave node requires an upgrade. In this state, the master node configures the slave image, transmits the image to the slave node, and reboots the slave node.
- Configuration synchronization (per slave) 360: the master node transits to this state when slave registration is successful and a TCP connection is established (for TCP transportation mode) with the slave node, and the current slave image is acceptable. In this state, the master node receives the current configuration of the slave node. If there is no saved configuration in the master node for the slave node (i.e., the slave node has joined the URF for the first time), the master node initializes a set of virtual interfaces on the master node based on reported slave interface database and a VLAN identifier. Otherwise, the master node retrieves a saved configuration for the slave node and sends the configuration to the slave node. If the configuration synchronization is successful, the master node transits to the "work" state, otherwise to the "registration failed" state.
- Work (per slave) 362: the master node transits to this state when slave registration and configuration are successful. In this state, the master node can control the slave node.

In FIG. 3B, when the master node is successfully initialized, it transits to the ready state (event 371). When the master node receives a registration message, it transits from the ready to the registration state (event 372). If the registration is successful, the master node can optionally transit to the transport-layer connection state (event 373). If the master node can successfully establish a TCP connection, it transits to the configuration synchronization state (event 374). Note that the master node directly transits from the registration state to the configuration synchronization state if the transportation mode is not TCP for the slave node. If configuration synchronization with the slave node is successful, the master node transits to the work state (event 375). If the slave node reboots or leaves the URF after successfully synchronizing the configuration, the master node again transits to the ready state (event 376).

If the master node determines that the slave image requires an upgrade, the master node transits to the upgrading state (event 377). When the slave node reboots after installing the image, the master node again transits to the ready state (event 378). If the TCP setup fails (event 379), the configuration synchronization fails (event 380), registration for the slave node fails (event 381), or upgrading the image fails (event 382), the master node transits to the registration failed state. If the slave node reboots or leaves the URF after the failure, the master node again transits to the ready state (event 383). In some embodiments, the master node sends the state information for a respective slave node to a standby master node, wherein the standby master node maintains states for the slave node locally based on the received information.

Figure 4A:
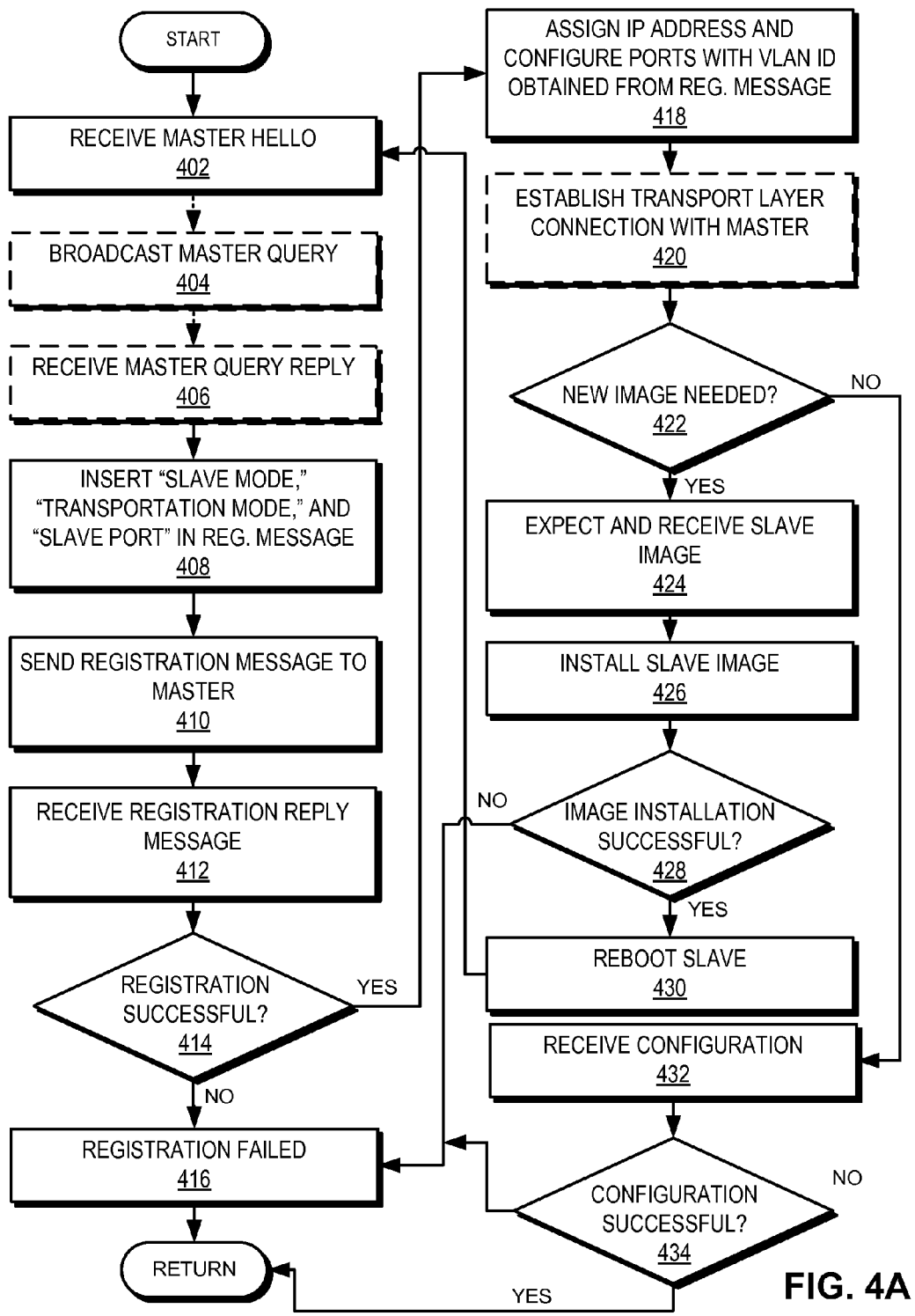
FIG. 4A presents a flowchart illustrating the process of a slave node registering with a master node, in accordance with one embodiment of the present invention.

FIG. 4A presents a flowchart illustrating the process of a slave node registering with a master node, in accordance with one embodiment of the present invention. The slave node can receive a hello message from the master node (operation 402), or can send a query master message to the master node (operation 404) and receive a query reply (operation 406) to initiate the registration process, as described in conjunction with FIG. 2. Once the registration process is initiated, the slave node inserts the "slave mode," "transportation mode," and "slave port" into a registration message (operation 408) and sends the message to the master node (operation 410). The slave node receives a registration reply message from the master node (operation 412) and checks whether the registration is successful (operation 414). If the registration process is successful, the slave node assigns itself an IP address received from the registration reply message and configures local internal ports based on a VLAN identifier obtained from the message (operation 418). The slave node can also create a virtual interface associated with the VLAN and the assigned IP address. This virtual interface enables the slave node to establish layer-3 connection with the master node.

Depending on the transportation mode of the slave node, the slave node can optionally establish a transport layer connection (i.e., a TCP connection) with the master node (operation 420).

During the registration process, the slave node checks whether a new image is needed for the slave node (e.g., when the slave node first joins a URF) (operation 422). If so, the slave node expects and receives a new slave image from the master node (operation 424) and installs the slave image (operation 426). If the image is successfully installed (operation 428), the slave is rebooted (operation 430) and the registration process restarts. If a new image is not needed (operation 422), the slave node receives a configuration from the master node (operation 432). If the slave node can successfully configure itself using the configuration (operation 434), the registration process is completed. If the registration is not successful (operation 414) or the configuration is not successful (operation 434), the slave node marks itself as "registration failed" (operation 416).

Figure 4B:
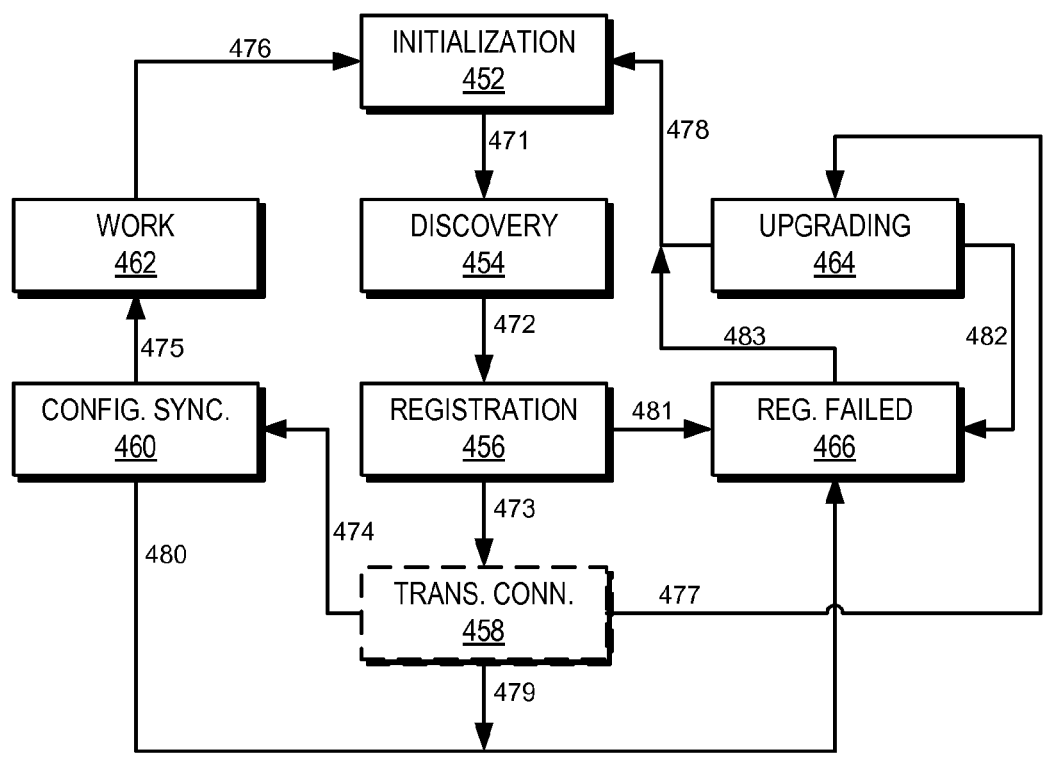
FIG. 4B presents a state diagram of a slave node registering with a master node, in accordance with one embodiment of the present invention.

FIG. 4B presents a state diagram of a slave node registering with a master node, in accordance with one embodiment of the present invention. The slave states include "initialization," "discovery," "registration," "registration failed," "upgrading," "configuration synchronization," "work," and optionally, "transport-layer connection"

Initialization 452: the slave node is in this state before it is ready to discover and register with the master node. This state indicates that the slave node is rebooting and initializing itself but has not completed the process.

Discovery 454: the slave node transits to this state when the initialization is completed but the slave has not received a master hello message. In this state, the slave node may send out the query master message to initiate the registration process.

Registration 456: the slave node transits to this state when it receives a master hello or query reply message from the master node. In this state, the slave node sends the slave registration message to the master node and waits for the registration reply message.

Transport-layer connection 458: the slave node transits to this state only when the "transportation mode" for the slave node is set to TCP. At this state, the slave node sets up a TCP connection with the master node based on a slave port number given in the slave registration message, wherein the three-way handshake for the TCP connection is initialized by the master node. The slave node then listens to the slave port until the TCP connection is established.

Registration failed 466: the slave node transits to this state when a failure occurs during registration, TCP connection setup, or configuration synchronization.

Upgrading 464: the slave node transits to this state when slave registration is successful (and for a TCP transportation mode, a TCP connection is established with the master node), but the current slave image on the slave node requires an upgrade. In this state, the slave node waits for a new image from the master node, and upon receiving the message, installs the message and reboots.

Configuration synchronization 460: the slave node transits to this state when the slave node has successfully registered with the master node, and the current slave image is acceptable. In this state, the slave node reports the current configuration to the master node and may receive a configuration from the master node.

Work 462: the slave node transits to this state when slave registration and configuration are successful. In this state, the slave node is controlled by the master node.

In FIG. 4B, when the slave node is successfully initialized, it transits to the discovery state (event 471). When the master node is discovered, the slave node transits from the discovery to the registration state (event 472). If the registration is successful, the slave node can optionally transit to the transport-layer connection state (event 473). If the slave node can successfully establish a TCP connection, it transits to the configuration synchronization state (event 474). Note that the slave node directly transits from the registration state to configuration the synchronization state if the transportation mode is not TCP. If configuration synchronization with the master node is successful, the slave node transits to the work state (event 475). If the slave node reboots, it again transits to the initialization state (event 476).

If the slave image requires an upgrade, the slave node transits to the upgrading state (event 477). When the slave node reboots after installing the image, the slave node again transits to the initialization state (event 478). If the TCP setup fails (event 479), the configuration synchronization fails (event 480), registration with the master node fails (event 481), or upgrading the slave image fails (event 482), the master node transits to the registration failed state. If the slave node reboots after the failure, the slave node again transits to the initialization state (event 483).

Message Formats

FIG. 5A illustrates a master-slave control (MSC) message header format, in accordance with an embodiment of the present invention. All the MSC messages are in type-length-value (TLV) format, wherein the type indicates the type of the message and the length indicates the length of the message. Version 502 specifies the version of the message and type 504 specifies the message type. Message types can include master hello, slave query, query reply, slave registration, registration reply, slave hello, CLI, CLI reply, data query, data report, and data report reply. Identifier length 506 specifies the length of an identifier in number of 4 byte octets. For example, it is 1 for an IP version 4 address, 4 for an IP version 6 address, and 2 for a media access control (MAC) address. Total length 508 specifies the total length of the message including the header in number of bytes in the message. Each node (a switch or a router) requires a unique identifier to identify the node in a URF. The source node identifier 510 is the source router or switch identifier of the message. For example, for an Ethernet connection, identifier 510 can be a layer-2 network address. Similarly, the destination node identifier 520 is the destination router or switch identifier of the message. For multicast messages, the destination node identifier is set to 0.

FIG. 5B illustrates a master hello message format, in accordance with an embodiment of the present invention. For this message, type 504 in the MSC header can be 0. The master hello message can be an Ethernet broadcast message for advertising the master node to the URF periodically. The destination node identifier 520 in the MSC header message is set to 0 for this message. This hello message is constructed with one or more sub-TLV messages, wherein a respective sub-TLV specifies an option for the hello message. Option type 552, option length 554, and option value 556 specify the type, length (expressed in number of bytes), and value of a sub-TLV. Similarly, option type 562, option length 564, and option value 566 specify the type, length, and value of another sub-TLV.

TABLE 1

| Option Type | Length | Value |
| --- | --- | --- |
| 1 | 2 | Hold time |
| 2 | 2 | Master priority |
| 3 | 6 | Master MAC |
| 4 | 4 or 16 | Master IP |

Table 1 specifies different options for a respective sub-TLV of a master hello message, in accordance with an embodiment of the present invention. A "hold time" instructs a respective slave node the amount of time (in seconds) that the slave node must keep the master node reachable. A "master priority" is used for a master node and one or more standby master scenarios. Under such a scenario, when one master node learns about another master node, the master node suppresses the advertisement of master hello messages if its "master priority" is lower than that of another master node. Consequently, only one node acts as the active master node in the URF, while other standby master nodes are treated as slave nodes. When the active master node fails, the standby master node with the highest master priority value starts operating as the master node for the URF. A "master MAC" specifies a MAC address of the master node. A "master IP" specifies an IP address of the master node. For IP versions 4 and 6, the corresponding lengths are 4 and 16, respectively For the query master message, type 504 in the MSC header can be 1. This message can be an Ethernet broadcast message for finding the master node in the URF. The destination node identifier 520 in the MSC header message is also set to 0 for this message. This message contains only the MSC header, as described in conjunction with FIG. 5A.

For the query reply message, type 504 in the MSC header can be 2. This message can be an Ethernet unicast message that the master node uses as a response to the query master message. The destination node identifier 520 in the MSC header for this message specifies the slave node identifier. This message has the same message body as the master hello message, as described in conjunction with FIG. 5B.

FIG. 6A illustrates a slave registration message format, in accordance with an embodiment of the present invention. For this message, type 504 in the MSC header can be 3. The slave registration message can be an Ethernet unicast message for a slave node registering with the master node. This registration message is also constructed with one or more sub-TLV messages. Option type 602, option length 604, and option value 606 specify the type, length (expressed in number of bytes), and value of a sub-TLV. Similarly, option type 612, option length 614, and option value 616 specify the type, length, and value of another sub-TLV.

TABLE 2

| Option Type | Length | Value |
| --- | --- | --- |
| 1 | 2 | Slave and trans. mode |
| 2 | 2 | Hold time |
| 3 | Any | Slave image version |
| 4 | Any | Authentication data |
| 5 | 6 | Slave MAC |
| 6 | 2 | Slave port |

Table 2 specifies different options for a respective sub-TLV of a slave registration message, in accordance with an embodiment of the present invention. A "slave mode" and a "transportation mode" can be represented using two bytes in the option value field (e.g., option value 606). The first byte of the corresponding option value indicates the slave mode, and the second byte of the option value indicates the transportation mode of the slave node. Values of 0 and 1 for the slave mode can specify a slave node and a standby master node, respectively. Similarly, values of 0, 1, and 2 for the transportation mode can specify layer-2, UDP, and TCP transportation modes for a slave node, respectively. A "hold time" of the slave node instructs a master node the amount of time (in seconds) that the master node must keep the slave node reachable. The "slave image version" specifies the current version of the slave image. The "authentication data" between the slave node and the master node facilitates secure communication within a URF. For example, such authentication data can be an encryption key. A "slave MAC" specifies a MAC address of the slave node. A "slave port" specifies a slave port number.

FIG. 6B illustrates a slave registration reply message format, in accordance with an embodiment of the present invention. For this message, type 504 in the MSC header can be 4. The registration reply message can be an Ethernet unicast message sent in response to a slave registration message from a master node to a slave node. State 652 specifies the state of the registration process, failure code 654 specifies the reason for failure, and reserved bytes 656 are used for alignment purposes. Option type 662, option length 664, and option value 666 specify the type, length (expressed in number of bytes), and value of a sub-TLV. Similarly, option type 672, option length 674, and option value 676 specify the type, length, and value of another sub-TLV.

A value of 1 for state 652 can indicate that the registration is successful and the slave image is acceptable. A value of 2 can indicate that the registration is successful and the slave image requires an upgrade. A value of 0 can indicate a failure, wherein a corresponding failure code 654 indicates a reason for the failure. A value of 0 for failure code 654 can indicate that the reason for the failure is unknown. A value of 1 can indicate that the authentication has failed. A value of 2 can indicate that the master node does not have enough resources to accept a new slave node. A value of 3 can indicate that the hardware of the slave node is not supported. A value of 4 can indicate that the software of the slave node is not supported (e.g., the slave node does not have the basic slave image).

TABLE 3

| Option Type | Length | Value |
| --- | --- | --- |
| 1 | 4 or 16 | Slave IP |
| 2 | 2 | VLAN ID |
| 3 | 2 | Master UDP port |

Table 3 specifies different options for a respective sub-TLV of a registration reply message, in accordance with an embodiment of the present invention. A "slave IP" specifies an IP address assigned to the slave node. For IP versions 4 and 6, the corresponding lengths are 4 and 16, respectively. A "VLAN ID" specifies a VLAN identifier based upon which the slave node configures the internal ports. A "Master UDP port" specifies a port number of the master node for any UDP communication with the slave node.

For the slave hello message, type 504 in the MSC header can be 5. The message format for this message is the same as the "slave registration" with an option type value of 1. This can be an IP message sent either over TCP or UDP, depending on the transportation mode of the slave node. This message is used for checking the aliveness of the slave node. If this message is not received by the master node for a period of time, the master node considers the slave node as failed.

FIG. 7A illustrates a command line interface (CLI) message format, in accordance with an embodiment of the present invention. For this message, type 504 in the MSC header can be 6. This can be an IP message sent either over TCP or UDP, depending on the transportation mode of the slave node. A CLI message is used for a master node to configure a slave node or display information from a slave. If a CLI command is issued for a slave node on a master node, the master node sends a CLI message to the slave node and waits for a reply from the slave node before issuing the next command. CLI session identifier 702 is used to distinguish among multiple CLI sessions. CLI format 704 specifies the format of the command carried by the CLI message. Values of 0, 1, and 2 for CLI format 704 can specify a CLI command, a simple network management protocol (SNMP) command, and an Extensible Markup Language (XML) command format, respectively. CLI type 706 specifies the type of the command. A value of 0 for CLI type 706 can specify a CLI configuration or SNMP set command, and a value of 1 can specify a CLI display or SNMP get command. CLI data 708 contains the CLI command which can be represented as an American Standard Code for Information Interchange (ASCII) data stream.

FIG. 7B illustrates a CLI reply message format, in accordance with an embodiment of the present invention. For this message, type 504 in the MSC header can be 6. This can also be an IP message sent either over TCP or UDP, depending on the transportation mode of the slave node. A CLI reply message is used for replying to a CLI message. This message contains the same CLI session identifier 702, CLI format 704, and CLI type 706 as the CLI command message, as described in conjunction with FIG. 7A. Additionally, this message includes a CLI state 712 indicating the state of the executed CLI command and a CLI reply data 720 specifying a message from the CLI command. CLI reply data 720 can be represented as an ASCII data stream. Values of 0 and 1 for CLI state 712 can specify success and failure, respectively. For a successful CLI command execution, the value for CLI reply data 720 can be NULL for a configuration command or an ASCII data stream displaying results for a display command. In a failure scenario, CLI reply data 720 can contain a corresponding error message.

Once a slave node is registered with a master node, they can exchange data as well. In some embodiments, data exchanged between the slave node and the master node is divided into two subtypes: 1) raw data: a chunk of data for which an application does not have to know details; and 2) structured data: any data with a structure known to both the master and the slave nodes. In some embodiments, structured data can be in a tabular form, wherein each entry is individually accessible by an application. FIG. 8A illustrates a raw data query message format, in accordance with an embodiment of the present invention. This can be an IP message sent either over TCP or UDP, depending on the transportation mode of the slave node. Data format 802 specifies the data format of the query, with a value of 0 indicating raw data. Data sequence number flag 804 indicates whether data is segmented. A value of 0 for flag 804 indicates that data is not segmented, and a value of 1 indicates that the data is segmented and a corresponding data sequence number 812 is present. Data subtype 806 specifies the subtype of raw data. In some embodiments, data subtypes for raw data are: 1) image; 2) configuration script; 3) configuration script execution result; 4) hardware forwarding table; 5) raw database; 6) raw statistics; 7) raw log; and 8) user data (i.e., a slave node can forward any data received from a user to the master node, and the master node can inject any data received from a user to a slave node). Reserved bytes 808 are used for alignment purposes. Transaction identifier 810 is used to distinguish among multiple data transactions. Data sequence number 812 identifies the data segment represented in the message.

FIG. 8B illustrates a structured data query message format, in accordance with an embodiment of the present invention. This can also be an IP message sent either over TCP or UDP, depending on the transportation mode of the slave node. Data format 822 specifies the data format of the query, with a value of 1 indicating structured data. Data sequence number flag 824 indicates whether data is segmented. Data subtype 826 specifies the subtype of structured data. In some embodiments, data subtypes for structured data are: 1) forwarding table; 2) topology table; 3) statistics table; and 4) interface table. Table type 828 and table subtype 830 indicate the type and subtype of the structured table, respectively. In some embodiments, table types and corresponding table subtypes for structured data are: 1) multiprotocol label switching (MPLS); 2) MAC; 3) IP version 4; 3.1) unicast forwarding information base (FIB) for IP version 4; 3.2) multicast FIB for IP version 4; 3.3) Internet Group Management Protocol (IGMP) snooping; 4) IP version 6; 4.1) unicast FIB for IP version 6; 4.2) multicast FIB for IP version 6; 4.3) multicast listener discovery (MLD) snooping. Reserved bytes 832 are used for alignment purposes.

Transaction identifier 838 is used to distinguish among multiple data transactions. Data sequence number 840 identifies the data segment represented in the message. Table index number 834 specifies the total number of table indices requested in the message, wherein a value of 0 indicates that the message is requesting for all tables for the specified type and subtype. Total table entries 836 specifies the total number of table entries requested in the message, wherein a value of 0 indicates that the message is for the whole table referenced by a given table index. Table indices 842 to 844 correspond to specific table entries requested in the message. Table entry lengths 846 to 848 specify the lengths of table indices 842 to 844, respectively. Table entry values 850 to 852 can specify the values of table indices 842 to 844, and can be used for retrieving value-specific information. For example, if table entry value 850 specifies an IP address in the query, a corresponding outgoing port and next hop router IP address can be sent in the reply.

FIG. 8C illustrates a raw data report message format, in accordance with an embodiment of the present invention. This message can be sent from a slave node or a master node, and can be solicited (sent in response to a data query message) or unsolicited (sent without any query). This can be an IP message sent either over TCP or UDP, depending on the transportation mode of the slave node. Most of the fields in FIG. 8C are defined in conjunction with FIG. 8A, so the same numerals are used to denote them. Flag 854 is used to notify the message receiver whether to send a reply to this message. When the flag is set, it instructs the receiver to send a reply to the message for a respective sequence number. Data total length 862 specifies the total length of the message before fragmentation. Note that this value is different from the total length 508 in the MSC header, as described in conjunction with FIG. 5A, which is the size of the fragment of message corresponding to the data sequence number 812. Data 864 contains the data that the message is reporting.

FIG. 8D illustrates a structured data report message format, in accordance with an embodiment of the present invention. This message can be sent from a slave node or a master node, and can be solicited or unsolicited as well. This can be an IP message sent either over TCP or UDP, depending on the transportation mode of the slave node. Most of the fields in FIG. 8D are defined in conjunction with FIG. 8B. so the same numerals are used to denote them. Flag 856 is used to notify the message receiver whether to send a reply to the message. Data total length 872 specifies the total length of the message before fragmentation. Op code 874 indicates a specific operation for structured data. For example, op code 874 can indicate operations such as add/delete/modify specific table entries or the whole table, etc. Op code 874 is used for unsolicited data report messages and can be ignored for solicited data report messages.

Table entry context values 880 to 882 can specify the final table context for a table entry. For example, if table entry value 850 specifies an IP address in the query, table entry context value 880 can specify a corresponding outgoing port and next hop router IP address. Lengths of these context values are specified in table entry context lengths 876 to 878, respectively. The table entry context can be defined in detail by a respective application.

FIG. 8E illustrates a raw data report reply message format, in accordance with an embodiment of the present invention. This can be an IP message sent either over TCP or UDP, depending on the transportation mode of the slave node. The receiving node of a data report message uses this message to send back confirmation for a respective segment of a data report message referenced by a sequence number. All fields in FIG. 8E are defined in conjunction with FIG. 8A, so the same numerals are used to denote them. FIG. 8F illustrates a structured data report reply message format, in accordance with an embodiment of the present invention. This can be an IP message as well and is used as a confirmation for a respective fragment of a data report message. All fields in FIG. 8F are defined in conjunction with FIGS. 8B and 8D, so the same numerals are used to denote them.

MSC Timers

Different timers are defined for a master node and a slave node to control the state and events for MSC. All timers are configurable on each individual node.

TABLE 4

| Timer Code | Node | Description |
| --- | --- | --- |
| Tm0 | M | Master hello message periodic interval |
| Ts0 | S | Wait time before sending query master message |
| Ts1 | S | Query master message periodic interval |
| Tm1 | M | Time limit for receiving slave configuration |
| Tm2 | M | Data query message periodic interval |
| Ts2 | S | Data report message periodic interval |
| Tm3 | M | Time limit for receiving CLI reply message |
| Tm4 | M | Time limit for receiving data report reply message |
| Ts3 | S | Slave hello message periodic interval |
| Tm5 | M | Time limit for setting up a TCP connection |
| Ts4 | S | Time limit for setting up a TCP connection |

Tm0: a master node broadcasts a master hello message to URF in every Tm0 period of time.

Ts0: after a slave node is initialized, it waits for Ts0 period of time before sending out a query master message. During this time, if the slave node receives a master hello message, it sends a slave registration message.

Ts1: a slave node broadcasts query master message in URF in every Ts1 period of time until it receives a master hello message or a reply query message.

Tm1: after a master node sends out the registration reply message to a slave node (for UDP mode), or after the master node has established a TCP connection (for TCP mode), the master node waits for Tm1 period of time to receive a data report message containing slave configuration.

Tm2: a master node sends a data query message in every Tm2 period of time to a slave node unless the master node receives a data report message from the slave node. In some embodiments, the master node sends the message for a pre-configured number of times in every Tm2 period of time, and if no data report message is received, the master node declares an error.

Ts2: a slave node sends a data report message in every Ts2 period of time to a master node unless the slave node receives a data report reply message from the master node. In some embodiments, the slave node sends the message for a pre-configured number of times in every Ts2 period of time, and if no data report reply message is received, the slave node declares an error.

Tm3: after a master node sends out a CLI message to a slave node, the master node waits for Tm3 period of time to receive a CLI reply message. If Tm3 expires, the master node displays an error.

Tm4: a master node sends a data report message in every Tm4 period of time to a slave node unless the master node receives a data report reply message from the slave node. In some embodiments, the master node sends the message for a pre-configured number of times in every Tm4 period of time, and if no data report reply message is received, the master node declares an error.

Ts3: a slave node sends a slave hello message to a master node in every Ts3 period of time.

Tm5: this timer is only applicable if the transportation mode is TCP. After sending a registration reply message to a slave node, a master node repeatedly tries to set up a TCP connection with the slave node for Tm5 period of time. If Tm5 expires, the master node moves to an error state.

Ts4: this timer is only applicable if the transportation mode is TCP. After receiving a registration reply message from a master node, a slave node listens for a TCP connection initiation for Ts4 period of time. If Ts4 expires, the slave node moves to an error state.

Exemplary System

Figure 9:
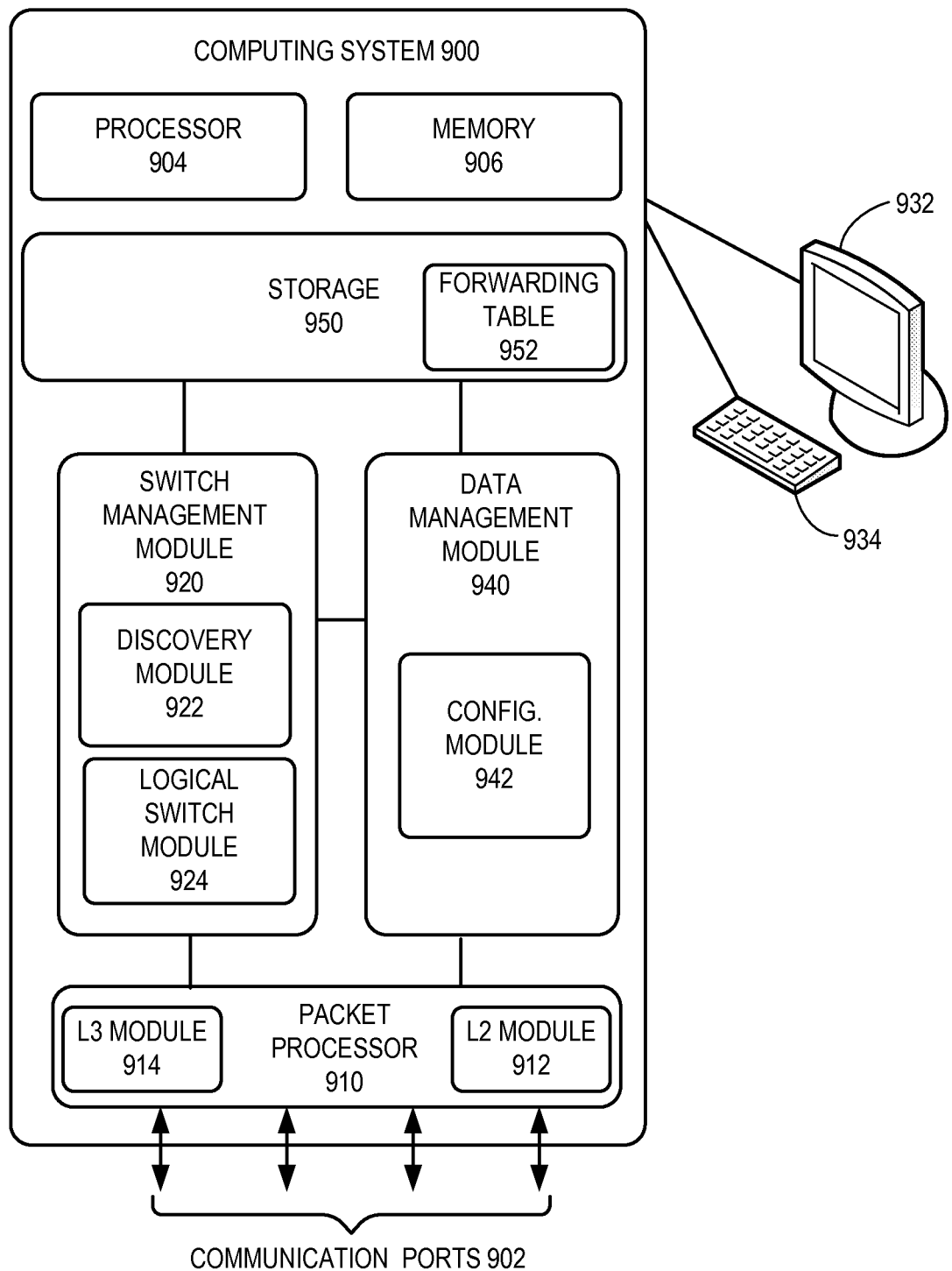
FIG. 9 illustrates an exemplary computing system, in accordance with one embodiment of the present invention.

FIG. 9 illustrates an exemplary computing system, in accordance with one embodiment of the present invention. In this example, computing system 900 includes a number of communication ports 902, which can transmit and receive data frames. Also included in system 900 are a processor 904, a memory 906, a packet processor 910, a switch management module 920, a data management module 940, and a storage 950. Switch management module 920 further includes a discovery module 922, and data management module 940 further includes a configuration module 942. Storage 950 includes a forwarding table 952 (which can also be referred to as an FIB). Switch management module 920 can also include a logical switch module 924. In some embodiments, system 900 is coupled to a display device 932 and an input device 934.

During operation, processor 904 executes operational instructions from memory 906. In some embodiments, the operational instructions are based on a switch image running on system 900. Packet processor 910 receives a packet from a remote node via one of the communication ports 902. If the packet is a layer-2 frame, layer-2 module 912 inspects the frame header. If the packet is a layer-3 packet, layer-3 module 914 inspects the packet header. Packet processor 910 extracts the contents from the packet and hands the contents to switch management module 920. If the packet is from a new node, discovery module 922 marks the node as a new node. Switch management module 920 then performs a registration between the node and system 900. In some embodiments, once the registration is completed, logical switch module 924 operates the system in conjunction with the remote node as a single logical switch.

After the registration, configuration module 942 sets up a configuration for the node. Configuration module 942, in conjunction with switch management module 920, can configure system 900 either as a master node or as a slave node. In some embodiments, a user (e.g., a network administrator) configures the system as a master node. Depending on the configuration, data management module 940, in conjunction with packet processor 910, exchanges data with the node via one of the communication ports 902 and updates forwarding table 952 accordingly.

In summary, embodiments of the present invention provide a computing system. In one embodiment, the computing system includes a processor, a memory, a discovery mechanism, a switch management mechanism, and a configuration management mechanism. The discovery mechanism discovers a remote switch. The switch management mechanism registers the remote switch and transmits a switch image to the remote switch, thereby allowing the remote switch to install the image. The configuration management mechanism configures the remote switch, thereby allowing the remote switch to be controlled by the computing system. In another embodiment, the discovery mechanism discovers a remote configuring system. The switch management mechanism registers the switch with the remote configuring system and receives a switch image from the configuring system. The configuration management mechanism configures the switch based on a received configuration from the configuring system, thereby allowing the configuring system to control the switch.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer system, comprising:
a processor configured to discover a remote switch;
a switch management mechanism coupled to the processor and configured to
transmit a switch configuration image to the remote switch and allow the remote switch to install the configuration image; and
a configuration management mechanism coupled to the processor to configure the remote switch, wherein the configuring allows the remote switch to be controlled by the computing system.

2. The computing system of claim 1, wherein the switch management mechanism is further configured to register the remote switch based on a received layer-2 frame; and
wherein the transmission of the switch configuration image and subsequent configuration of the remote switch are done over layer-3.

3. The computing system of claim 1, wherein the switch management mechanism is further configured to transmit an updated switch configuration image for installation in the remote switch.

4. The computing system of claim 1, wherein the switch management mechanism is further configured to assign a layer-3 network address to the remote switch.

5. The computing system of claim 4, wherein the switch management mechanism is further configured to establish a Transmission Control Protocol (TCP) connection with the remote switch using the layer-3 network address.

6. The computing system of claim 1, wherein the configuration management mechanism is further configured to send forwarding information to the remote switch, wherein the forwarding information is specific to the remote switch.

7. The computing system of claim 1, wherein the configuration management mechanism is further configured to send a Virtual Local Area Network (VLAN) identifier to the remote switch, wherein an interface coupling the computer system to the remote switch is configured with the VLAN identifier.

8. The computing system of claim 1, wherein the switch management mechanism is further configured to determine whether the remote switch is active.

9. The computing system of claim 1, further comprising a data management mechanism configured to exchange specific elements of tabular data with the remote switch, wherein the tabular data is present in the computing system and the remote switch.

10. A computer-executable method, comprising:
discovering, by a computer system, a remote switch;
transmitting a switch configuration image to the remote switch; installing the configuration image at the remote switch; and
configuring the remote switch, wherein said configuring allows the remote switch to be controlled by the computing system.

11. The method of claim 10, further comprising registering the remote switch based on a received layer-2 frame; and
wherein the transmission of the switch configuration image and subsequent configuration of the remote switch are done over layer-3.

12. The method of claim 10, further comprising transmitting an updated switch configuration image for installation in the remote switch.

13. The method of claim 10, further comprising assigning a layer-3 network address to the remote switch.

14. The method of claim 13, further comprising establishing a Transmission Control Protocol (TCP) connection with the remote switch using the layer-3 network address.

15. The method of claim 10, further comprising sending forwarding information to the remote switch, wherein the forwarding information is specific to the remote switch.

16. The method of claim 10, further comprising sending a Virtual Local Area Network (VLAN) identifier to the remote switch, wherein an interface coupling the computing system to the remote switch is configured with the VLAN identifier.

17. The method of claim 10, further comprising determining whether the remote switch is active.

18. The method of claim 10, further comprising exchanging specific elements of tabular data with the remote switch, wherein the tabular data is present in the computing system and the remote switch.

19. A switch, comprising:
a processor configured to discover a remote configuring system;
a switch management mechanism coupled to the processor and configured to
receive a switch configuration image from the configuring system and allow the switch to install the configuration image; and
a configuration management mechanism coupled to the processor to configure the switch based on received configuration information from the configuring system, wherein the configuring allows the configuring system to control the switch.

20. The switch of claim 19, wherein the switch management mechanism is further configured to register with the configuring system based on a received layer-2 frame; and
wherein the reception of the switch configuration image and subsequent configuration of the switch are done over layer-3.

21. The switch of claim 19, wherein the switch management mechanism is further configured to install the switch configuration image received from the configuring system.

22. The switch of claim 19, wherein the configuration management mechanism is further configured to operate as a backup configuring system in response to the configuring system being unavailable.

23. The switch of claim 19, wherein the configuration management mechanism is further configured to receive a layer-3 network address and a Virtual Local Area Network (VLAN) identifier from the configuring system.

24. The switch of claim 23, wherein the configuration management mechanism is further configured to:
configure an interface coupling the switch to the configuring system using the VLAN identifier; and
create a virtual interface using the layer-3 network address and the VLAN identifier.

25. The switch of claim 19, further comprising a data management mechanism configured to exchange specific elements of tabular data with the configuring system, wherein the tabular data is present in the switch and the configuring system.

* * * * *